Nov. 14, 1950 — P. J. CADE — 2,529,796
ELECTRONIC CONTROL APPARATUS
Filed May 12, 1944 — 3 Sheets-Sheet 1

Inventor
Phillip J. Cade
By [signature]
Attorney

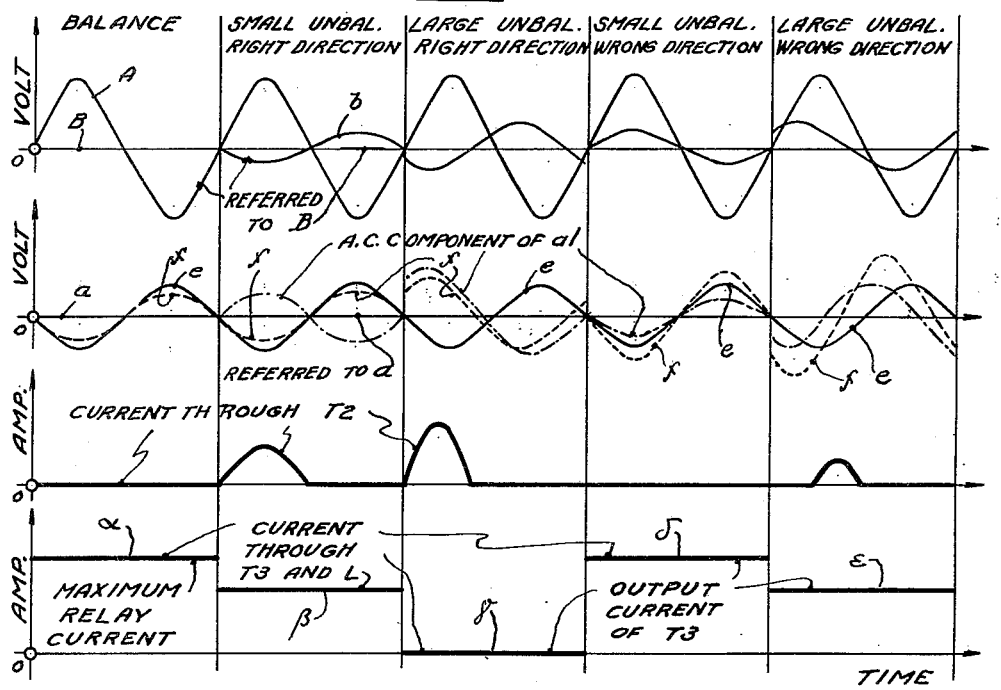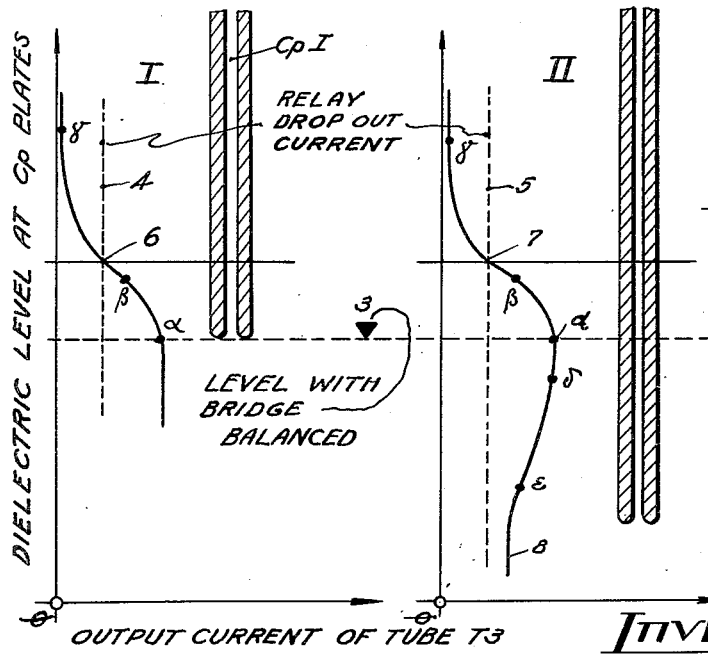

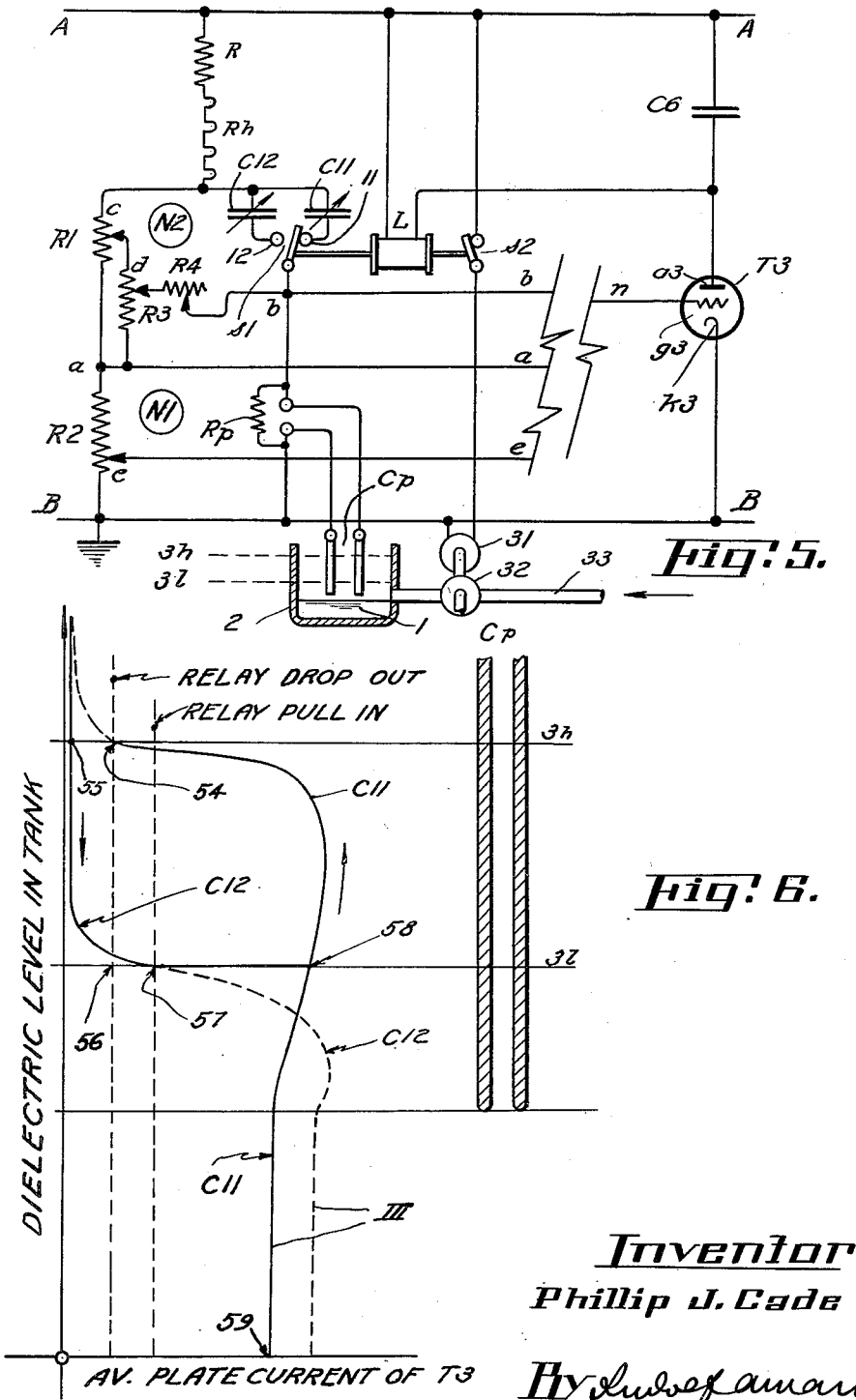

Patented Nov. 14, 1950

2,529,796

UNITED STATES PATENT OFFICE 2,529,796

ELECTRONIC CONTROL APPARATUS

Phillip J. Cade, Cambridge, Mass., assignor to Photoswitch, Incorporated, Cambridge, Mass., a corporation of Massachusetts Application May 12, 1944, Serial No. 535,361

14 Claims. (Cl. 250—27)

This invention relates to electric control apparatus of the type wherein a variable voltage, dependent upon the value of a detecting impedance, indicates or controls the operation of an installation supervised in terms of that impedance, through the intermediary of alternating current supplied electron discharge devices.

Some of the principal objects of the present invention are to provide a circuit of the above general type which inherently avoids falsification of the supervising impedance variation signals, which falsification may be caused by unintended unbalancing of a detecting bridge network; to provide for compensation of falsifying conditions of a detecting network such as small leakage current across a condenser probe; to provide a circuit which transmits from a detecting network only signals which originate in the impedance variation intended for detecting the condition in question, whereas other uncontrollable or otherwise extraneous signals are effectively excluded; to provide a circuit which transmits to relay apparatus whose functioning depends upon a fixed voltage level such as ground, a supervising alternating current signal which is tied to any desirable alternating voltage level with respect to ground; to provide a circuit which is able to apply to an alternating current-supplied electronic discharge device a unidirectional controlling voltage which is opposed to the cathode potential of the device; to provide a circuit of this type which can be made to function correctly regardless of the phase relation between the alternating current supply source and the supervising alternating current signal; to provide apparatus of this type which contains a condenser probe responding to varying penetration thereinto of supervised dielectric material, which secures unequivocal operation regardless of the above-mentioned phase relation, and which permits electrical predetermination of the critical position of the supervised dielectric at which the apparatus is to respond; to provide for adjustment of the time interval after which the controlled apparatus responds to a detecting impedance change, thus permitting elimination of the effect of short fluctuations in the supervised condition; and generally to provide apparatus of this type which employs a minimum of electronic equipment and is therefore comparatively simple, rugged and inexpensive, but is nevertheless exact and reliable in operation even under unfavorable conditions.

In one of its aspects, the invention attains these objects by feeding the unbalance signal of a symmetrical alternating current bridge incorporating a detecting impedance, into a direct current operated amplification stage which, although ultimately fed from the alternating current supply also feeding the bridge, is by a rectifying network protected from being affected by alternating current signals other than those due to bridge unbalance.

In another aspect, the present circuit utilizes a detecting bridge network which permits compensation of small detector leakage resistance with a balancing resistance.

In still another aspect, the circuit according to the invention utilizes a direct current signal having a given reference level which is produced from an alternating current signal whose reference level differs from the first-mentioned level by an alternating potential of any desired phase, magnitude or frequency, for applying a negative bias to the control element of an amplifying tube, by feeding the alternating current signal into a network which rectifies the signal proper into a direct current signal for gradually charging a biasing condenser which introduces a negative voltage between grid and cathode of an alternating current operated tube.

These and other objects and aspects will be more fully apparent from the following description of a practical embodiment illustrating the genus of the invention. The description refers to a drawing in which Fig. 1 is the circuit diagram of level detecting apparatus incorporating the present invention;

Figs. 2 to 4 are diagrams illustrating the operation of apparatus according to Fig. 1;

Fig. 5 is a circuit diagram similar to Fig. 1, of another embodiment of the invention; and Fig. 6 a diagram illustrating the operation of the embodiment according to Fig. 5.

Figure 1:
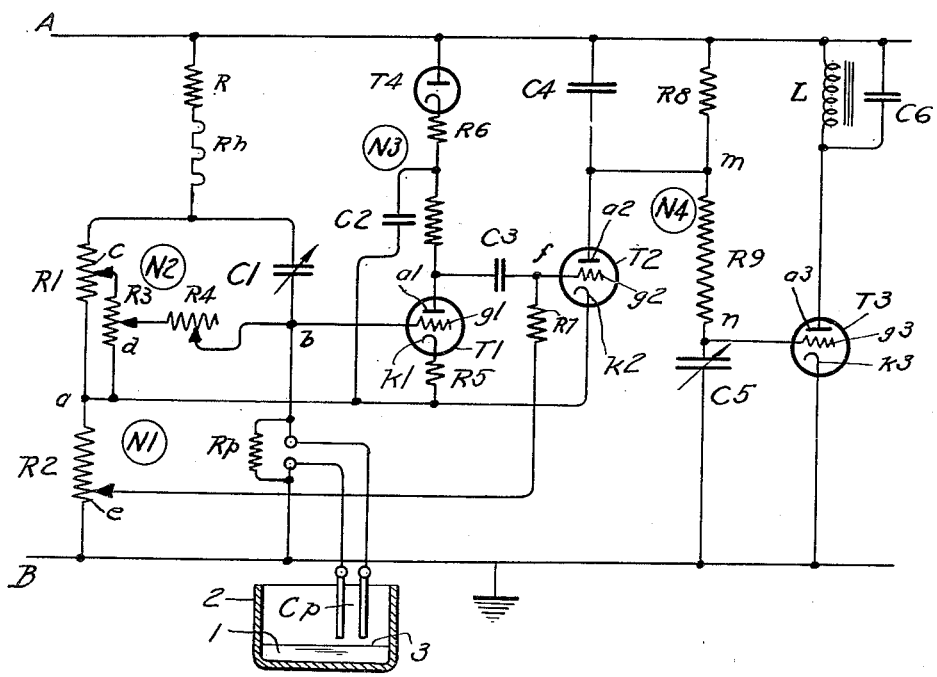

In Fig. 1, A and B are the wires of a conventional alternating current supply line, one of which, for example B, may be grounded. Connected between A and B is a voltage dividing network consisting of resistances R, R1 and R2; the heaters of the electron tubes of the circuit may be connected in series with R, as indicated at Rh.

Resistances R1 and R2, connected at tap $a$, are also part of a detecting bridge network N1 which includes in addition to resistors R1 and R2 and adjustable condenser C1 and connected thereto at tap $b$ a detecting condenser or condenser probe Cp which latter may be of the type described in copending application Serial No.

518,129, filed January 13, 1944, now matured into U. S. Patent No. 2,387,365.

As shown in Fig. 1 the probe capacity may be employed to detect the level of a nonconductive liquid or powder 1 contained in a vessel 2, the dielectric constant of the liquid being greater than that of the medium which normally constitutes the condenser dielectric, as for example air.

It will be noted that network N1 constitutes a symmetrical resistance-capacity bridge. Condenser C1 is preferably of the type having a zero temperature coefficient of capacity. These characteristics, together with provisions, to be described below, for balancing leakage resistance of detecting condenser Cp, make it possible to keep the bridge circuit balanced regardless of line voltage, temperature or tube characteristics.

The bridge network N1 is associated with a balancing network N2 which contains the balancing resistance R3 connected between an adjustable tap c of resistance R1 and the point a between resistors R1 and R2, and the grid return resistance R4 connected between bridge junction points a and b through an adjustable tap d of resistance R3.

Potential differences appearing between points d and b are transmitted to the input circuit of a detecting electron discharge tube T1 with anode a1, cathode k1, and grid g1. Grid g1 is connected to tap b between bridge condensers C1 and Cp whereas cathode k1 is connected to tap a between bridge resistors R1 and R2. A biasing resistance R5 is inserted between cathode k1 and tap a.

The tube T1 is supplied with current that is unidirectional with respect to point a by means of a directional network N3 which may include a rectifier tube T4 and a filter circuit consisting of resistor R6 and condenser C2.

Tube T1 feeds through a coupling condenser C3 into a signal transmitting tube T2 with anode a2, k2 and grid g2. A biasing resistor R7 is connected from an adjustable tap e of resistor R2 to a point f between condenser C3 and grid g2.

The tube T2 feeds into a biasing network N4 which includes a load resistance R8 bypassed from point m by a condenser C4 whose impedance is low as compared to R8; a charging resistor R9 and a low impedance timing and bias control condenser C5.

A relay tube T3 with cathode k3, anode a3, and grid g3 is connected between line wires A and B, with cathode k3 joined directly to wire B. A load inductance L, for example the coil of a relay magnet is inserted in the anode circuit of tube T3. A current-smoothing condenser C6 is connected in parallel to inductance L. The grid g3 is connected to a point n between resistor R9 and bias control condenser C5.

The magnet L may operate a switch, controlling for example a signaling device, or apparatus concerned with the supply of material to container 2; such control apparatus is not shown and described since it is not a part of the present invention.

It will be understood that all control tubes, namely T1, T2 and T3 can be multielectrode tubes, and that several electrode systems may be arranged in a single envelope; for example systems T1 and T2, and T3 and T4 may be joined in tubes of types 6SL7-GT and 32L7-GT respectively.

The above-described arrangement operates as follows.

It may be assumed that, with the material whose level is to be supervised below the bottom of condenser probe Cp, the bridge network N1 is so adjusted with the aid of resistor R3 and tap c that bridge taps a and b are at the same alternating potential with respect to line B. Any small constant probe leakage resistance, indicated in Fig. 1 by leakage resistance Rp, can be compensated by adjusting slide d which applies to grid g1 through resistor R4 an alternating voltage of such phase and magnitude as to cancel any small unbalance voltage introduced by leakage resistance Rp. The above-mentioned features of the bridge, namely a temperature coefficient of zero for condenser C1 and the symmetrical arrangement of the bridge tend to maintain this balance under conditions of varying temperature.

The output circuit of tube T1 is impressed with a direct current voltage supplied by the rectifier network N3, tube T4 blocking current flow in one direction, and a filter network consisting for example of impedances R6 and C2 smoothing the unidirectional current. It will be noted that absolutely, with regard to wire B, elements a1 and k1 carry alternating potentials, but that the voltage therebetween and with respect to cathode k2 is essentially constant, so that normally no signal is impressed on grid g2 through condenser C3.

Resistance R5 applies a direct current bias to grid g1 of tube T1 of such a value that tube T1 carries, with the bridge balanced, a steady output current which, due to its direct current character, is blocked by condenser C3 from affecting tube T2.

Tube T2 operates on alternating voltage between line A and tap a. A bias is applied to this tube by means of resistor R7 connected between grid g2 and tap e of resistor R2. Due to this arrangement grid g2 is negative when plate a2 is positive, so that tube T2 is normally nonconductive.

With tube T2 nonconductive, there is very little voltage drop across low impedances C4 and C5, and practically the entire line voltage appears across resistor R9. For this reason, grid g3 of tube T3 is practically at the potential of cathode k3 so that tube T3 conducts normally during the half cycles when wire A is positive. The corresponding fluctuating current passes through the load impedance L, C6, the alternating current component being passed around magnet coil L through condenser C6, whereas the direct current component maintains the relay magnet L energized. The relay in turn maintains in normal operating condition whatever installation element is to be controlled, for example the feeding mechanism for tank 2.

If the medium 1 in tank 2 now reaches probe Cp, the capacity of Cp increases, assuming that the dielectric constant of 1 is greater than that of air or whatever medium is replaced by medium 1. The bridge becomes unbalanced and an alternating voltage appears across taps a and b. This alternating voltage is fed to grid g1, is amplified in T1 and passed through C3 to grid g2 of tube T2. As will be explained more in detail below, the phase of this alternating voltage is such that it overcomes the cut-off bias of T2 and renders it conductive during the half cycles when plate a2 is positive.

The alternating current component of the output of tube T2 is bypassed by condenser C4, whereas the direct current component charges condenser C4 and causes a unidirectional voltage drop across resistance R8. With regard to this direct voltage drop, tube T2 may be regarded as a grid-controlled rectifier, the alternating current potential on grid $g2$ determining the conductivity of tube T2 and hence this voltage drop. Since condenser C4 and resistor R8 are so dimensioned that the time constant of circuit C4–R8 is large as compared with the period of the alternating line voltage, condenser C4 charges to approximately the peak value of the above-mentioned unidirectional voltage drop across resistance R8. This charge on condenser C4 is impressed, through resistor R9, upon condenser C5 which charges to about the same voltage. The charge on C4 is in this manner transferred, by network N4, from reference wire A to reference wire B, which wires are at every instant at opposite alternating potential.

Regarding this transfer of a direct voltage to a point of opposite instantaneous alternating current potential, it should be kept in mind that condenser C5, connected to line B, lies at the same direct current potential as line A, since the average or direct potential difference between A and B is zero. This is due to the fact that the instantaneous alternating potential difference, which is not zero but the momentary line voltage, is bypassed by condensers C4 and C5 and appears with almost its entire value across resistor R9 and in no way affects the charging of condensers C4 and C5. Hence, there is only a normally negligible alternating voltage drop across C4 and none across C5, whereas the voltage appearing across C4 with tube T2 becoming conductive, charges condenser C5 so that its plate on terminal $n$ becomes negative with respect to the other plate on the line wire B. Consequently, grid $g3$ becomes more negative with respect to cathode $k3$, reducing the output current of tube T3 until relay L drops out. The relay thus actuates whatever signaling or operating apparatus may be used in the particular installation.

Figure 2:
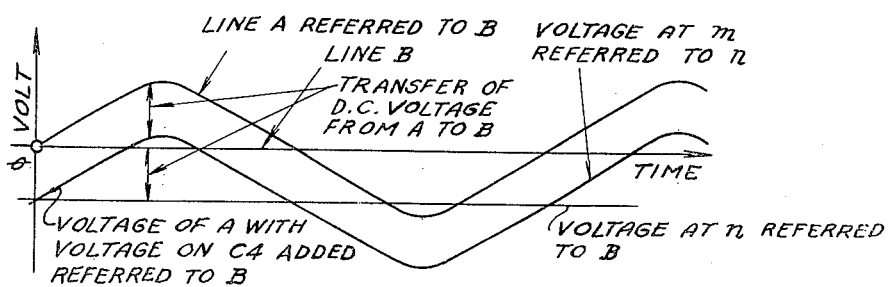

These operating conditions will be quite clear from diagram Fig. 2 which shows the relationship of the potentials of the respective circuit elements of network N4.

It will now be evident that the rate at which the potential of grid $g3$ decreases with reference to that of cathode $k3$ is controlled by the capacity of condenser C5 and resistance of resistor R9. Hence, if this condenser is made variable as indicated in Fig. 1, the time interval between the instances when the bridge becomes unbalanced and when the relay responds can be adjusted. In this manner it becomes possible to render the relay unresponsive to such fluctuations of the detecting impedance (due for example to level fluctuations such as splashing) which it is not desired to detect. It will be noted that this function is inherent in the present circuit and does not require the adding of a network or other device designed especially for this purpose.

It should be understood that the transfer to condenser C5 of the direct voltage across resistance R8, as effected by the conductivity of tube T2, is in itself not dependent upon the function of condenser C4. Since resistance R9 is large as compared to R8 and almost to the entire line voltage appears across R9, condenser C5 would, in the absence of condenser C4, charge to the average (instead of peak) value of the direct current voltage across resistance R8. The condenser C4 is however quite valuable and often indispensible, since it permits employment of the substantially maximum voltage available across R8, with the consequent increase of available control potential and the faster and more certain response of tube T3 to the change of potential of its grid.

It will now be evident that the function of network N4 is independent of any polarity, so that L might be connected to wire B, and C5 and $k3$ to wire A.

Unlike other bridge networks, alternating current bridges of the type herein described (with two resistance arms on one side and two capacity arms on the other side) are normally not subject to progressive phase shift of the unbalance signal with respect to the bridge source voltage, as the bridge is progressively unbalanced. The present circuit is normally also unresponsive to unbalance in the wrong direction, that is unbalance due to a decrease of capacity $Cp$, because such unbalance produces a signal 180° out of phase with the signal produced by unbalance in the right direction with $Cp$ increasing. A signal having this phase relation adds to the negative bias of tube T2 which bias is even normally sufficient alone to maintain this tube nonconductive. Unbalance in the right direction, that is with increasing capacity $Cp$, produces a signal which tends to overcome this negative bias affecting network N4 and tube T3 in the above-described manner. As will be explained more in detail hereinbelow, this has the advantage of permitting the bridge to be set normally off balance in the wrong direction, thus providing a generous margin of operation and also making it possible to balance the bridge at any point on the probe without incurring the danger of energizing the relay if the dielectric between the plates of probe $Cp$ falls, decreasing capacity $Cp$, without actually falling below a predetermined critical level. Such setting does not affect the desirable insensitivity to change of line voltage or tube characteristic, since such changes, although they affect the magnitude of the unbalance signal, cannot trip the relay because the latter signal is then not of proper phase to decrease the bias on tube T2.

However, if the value of resistance R4 is not negligible as compared to the impedance of condensers C1 or $Cp$, an unbalance phase shift is introduced which causes the unbalance signal voltage to lead the line voltage, regardless of the direction, right or wrong, of the unbalance. In that case, sufficient unbalance in the wrong direction might cause a phase shift sufficient to overcome the bias of tube T2 during a small portion of its conducting half cycle, which might cause deenergization of relay L.

As a matter of fact, resistance R4 is not, in most instances, much larger than the impedances of C1 and $Cp$, but the unbalance of $Cp$ in the wrong direction required to deenergize T3 and trip L is ordinarily too large, as compared with that sufficient for unbalance in the right direction, so that the probe capacity decrease would have to be impractically large in order to cause that undesirable effect. Hence, the above-described operation is not impaired even with moderately low R4.

It should be kept in mind in this connection that the phase shift can be controlled by means of adjusting R4, so that almost any desired unbalance characteristic of the bridge with respect to the relay current can be obtained.

These characteristics of construction and operation will be better understood with reference to diagrams Figs. 3 and 4, which are drawn for the normal case where R4 is not negligible, although not extremely large, as compared to C1 and Cp, so that the phase of large unbalance signals is slightly shifted with regard to the phase of the line voltage.

Fig. 3 indicates how the output current of tube T2 and hence the voltage drop in R8 and the output current of T3 (so far as it depends on the signal from the bridge and not on the setting of C5) depend to a certain extent upon the phase relationship to the supply voltage of the bridge unbalance voltage, fed into $g_1$, as well as upon the magnitude of the latter. In Fig. 3, four different possibilities are plotted by way of example, one for slight unbalance in one direction which corresponds to an increase of the probe capacity Cp, above referred to as the right direction, a second one for large unbalance in the right direction, a third one for small unbalance in the other or wrong direction, and a fourth for considerable unbalance in the wrong direction. In Fig. 3, the voltage and current curves are identified by the marks of those elements and circuit points of Fig. 1 which carry the respective potentials or currents. These curves are slightly exaggerated for the purpose of illustration.

Fig. 4 shows the relation between the output current of T3 (taken from Fig. 3, as indicated by corresponding points $a, \beta, \gamma, \delta, \epsilon$ of Figs. 3 and 4), and hence the current effective for operating the relay device controlled by coil L, plotted as a function of the bridge unbalance (in terms of amplitude as well as phase) expressed by the height to which the supervised dielectric material 1 has penetrated between the plates of probe condenser Cp. The two principal possibilities are shown, namely (I) when the bridge is adjusted for balance with the dielectric level 3 just reaching the probe CpI, and (II) with the bridge balanced with the level 3 well within the probe CpII. These different level positions for bridge balance can of course be set by means of the adjustable bridge components. The current value at which the relay becomes deenergized is indicated by the intersection points 6, 7 of curves I, II with the relay drop-out current levels indicated by lines 4 and 5.

It will be noted that it is in this manner possible to set the condition at which the device will operate, as for example the liquid level, by purely electrical means.

It will be further noted that due to appropriate utilization of the phase shift of the bridge unbalance, there will be no tripping of the relay upon receding of the level, even if the circuit is set at a tripping level for a comparatively high dielectric penetration, as indicated at II of Fig. 4. This means that the relay will drop out at point 7, but not at any level of the dielectric below 7.

Due to its characteristics as described above with reference to Fig. 4, the circuit according to the present invention can be utilized for distinguishing by purely electrical means, that is without resorting to expedients such as multiple electrode structures, several critical impedance conditions as for example levels of dielectric material. A practical embodiment based upon this feature of the invention will now be described with reference to Fig. 5.

In Fig. 5, the essential elements are the same as in Fig. 1, with the exception that condenser C1 is replaced by two variable condensers C11 and C12 which are arranged in parallel and either of which can be selectively connected to point b, by means of a change-over switch s1 with contacts 11 and 12 leading to condensers C11 and C12, respectively. Switch s1 is operated by relay magnet L which, when energized, closes contact 11 connecting condenser C11 to bridge circuit N1, whereas, with magnet L deenergized, contact 12 is closed and condenser C12 connected instead.

Magnet L also operates an actuating switch s2 which may be closed when L is energized, connecting to the line, or to any other power supply, conventional means for feeding dielectric material into tank 2, such a motor 31 and pump or valve 32 controlling the supply of the material through conduit 33.

The other elements of this circuit are the same as those between wires a, b, e, and n, respectively, of Fig. 1 and hence not repeated in Fig. 5.

The condensers C11 and C12 are so adjusted that the relay L will pull in at the point $3l$ and drop out at the point $3h$, as shown in Fig. 6, wherein curves III correspond to curve II of Fig. 4 whose significance is explained above. Curves marked C11 and C12 relate to condensers C11 and C12, respectively.

The unit according to circuit diagram Fig. 5 will operate as follows.

First, assuming the tank to be empty, the relay current will have the magnitude indicated by point 59 of Fig. 6. As the level of the dielectric rises, the relay current remains constant until the level reaches the bottom of the probe Cp. As the level continues to rise, the relay current will increase slightly, passing through point 58 and then to point 54 at which point the relay will drop out and the plate current decrease to the value indicated by point 55. If the level of the liquid should continue to rise from this point, the relay current would follow the solid line ascending from point 55; if the relay controls the supply of dielectric material as for example illustrated in Fig. 5, the dielectric level will drop along line C12 passing through points 56 and 57. At point 57, the relay pulls in again and the relay current increases to the value corresponding to point 58. In this manner, the level of the dielectric liquid can be maintained between heights $3l$ and $3h$.

It should be understood that the present disclosure is for the purpose of illustration only and that this invention includes all modifications and equivalents which fall within the scope of the appended claims.

I claim:

1. Electronic apparatus for detecting changes of a supervising capacitance comprising: an alternating current source having first and second terminals; a bridge network including two resistors connected in series to said source, two capacitors connected in series to said source, one of said capacitors constituting said supervising capacitance, and an adjustable resistor for balancing leakage resistance of said supervising capacitor; a first electron discharge device having a control electrode connected to a bridge junction point between said capacitors and a cathode connected to a bridge junction point between said resistors; a rectifier and a filter network in the anode connection of said discharge device; a second electron discharge device having a control grid, an anode connected to said first terminal and a cathode connected to a point between said two resistors; a capacitor arranged for coupling the control grid of said second device to the output circuit of said first device; a biasing network connected to said source and including in series connection a low resistance connected to said first terminal, a high resistance, and a low impedance condenser connected to said second terminal, and a capacitor shunting said low resistance, the anode connection of said second device being through said parallel-connected shunting capacitor and low resistance; and a third electron discharge device having an output circuit connected to said source, a load impedance in said output circuit, and a control grid connected to a point between said high resistance and said low impedance capacitor, so that the charge on said low impedance capacitor, resulting from an increase in the conductivity of said second device, applies to said last-named control grid a voltage tending to render said third device less conductive.

2. Electronic apparatus for detecting changes of a supervising capacitance comprising: an alternating current source having first and second terminals; a bridge network including two resistors connected in series to said source, and two capacitors connected in series to said source, one of said capacitors constituting said supervising capacitance; a first electron discharge device having a cathode connected to a bridge junction point between said resistors, an anode connected to a said first terminal, and a control grid connected to a bridge junction point between said capacitors; a rectifier in said anode connection of said discharge device; a second electron discharge device having a control grid, an anode connected to said first terminal and a cathode connected to said point between said resistors; alternating current coupling means between the grid of said second device and the output circuit of said first device; a biasing network connected to said source in parallel with said second discharge device and including in in series connection a low resistance connected to said first terminal, a high resistance, and a low impedance condenser connected to said second terminal; and a third electron discharge device having an output circuit connected to said source, a load impedance in said output circuit, and a control grid connected to a point between said high resistance and said low impedance capacitor, so that the charge on said low impedance capacitor, resulting from an increase in the conductivity of said second device, applies to said last-named control grid a voltage tending to render said third device less conductive.

3. Electronic apparatus for detecting changes of a supervising impedance comprising: an alternating current source having first and second terminals; a bridge network including two series connected resistance arms connected in parallel with two series connected capacitance arms across said terminals, the capacitance arm nearest said second terminal constituting said supervising impedance; a first electron discharge system having a cathode connected to the junction point between said resistances, an anode connected to said first terminal and a control grid connected to the junction point between said capacitances; a directional network adapted to rectify the voltage applied to said anode and cathode; a second electron discharge system having a control grid coupled by capacitance to the output circuit of said first system and an anode connected to said first terminal; a biasing network connected to the output circuit of said second system and adapted to establish a unidirectional potential difference proportionate to the alternating current input of said second system; and a third electron discharge system having a cathode and a control grid connected to receive said unidirectional potential difference from said network; said unidirectional potential applying to said grid of said third system, upon an alternating potential difference appearing between said bridge junction points and increasing the conductivity of said second system, a voltage tending to render said third system less conductive.

4. Electronic apparatus for detecting changes of a supervising impedance comprising: an alternating current source having first and second terminals; a bridge network including two resistors connected in series to said source, a capacitor constituting said supervising impedance, a capacitance system including two exchangeable capacitors of unequal capacitance and switching means for connecting one or the other of said exchangeable capacitors to said source in series with said supervising impedance; a first electron discharge system having a cathode connected to a first bridge junction point between said resistors, an anode connected to a terminal of said alternating current source and a control grid connected to a second bridge junction point between said capacitance system and said supervising impedance; a directional network adapted to rectify the voltage applied to said anode and cathode; a second electron discharge system having a control grid coupled by a capacitance to the output circuit of said first system, a cathode connected to said first junction point, and an anode connected to the terminal to which the anode of said first discharge device is connected; a biasing network connected to the output circuit of said second system and adapted to establish a unidirectional potential difference proportionate to the alternating current input of said second system; a third electron discharge system having an output circuit containing relay means adapted to operate said switching means, and a cathode and a control grid connected to receive said unidirectional potential difference from said network; said unidirectional potential applying to said grid of said third system, upon an alternating potential difference selected by said switching means appearing between said bridge junction points and increasing the conductivity of said second system, a voltage tending to render said third system less conductive.

5. In electronic apparatus wherein unbalance of intermediate normally equipotential junction points of a bridge network indicates variation of one of the bridge impedances, an electron discharge system having cathode and control electrode, a connection from said cathode to the junction point of one side of the bridge, a connection from said control electrode to the other one of said junction points, a grid return connection from one of said junction points to a variable tap on one of the bridge impedances in the opposite side of the bridge.

6. Electronic apparatus for differentially detecting changes at two regions of the range of a variable supervising impedance, comprising a bridge network including on one side of a junction point of said network capacitance means constituting said supervising impedance and on the other side of said junction point a capacitance system including two exchangeable capacitors of unequal impedance and selecting means for inserting one or the other of said capacitors in said bridge, means connected to said junction point for transmitting and amplifying an unbalance voltage of said bridge network, and relay means operated by said transmitting means for actuating said selecting means, whereby actuation of said relay means with the bridge as conditioned by one of said capacitors inserts the other capacitor, thereby differently conditioning the bridge.

7. In electronic level supervising apparatus; a detecting bridge network comprising two series connected resistance arms which are connected across a current source in parallel with two series connected capacitance arms, one capacitance arm consisting of a capacitance probe adapted for immersion in the material whose level is to be supervised; means for connecting the normally equipotential junction points between said resistance arms and said capacitance arms to electrical relay means; and a grid return resistor connected between the junction point of said capacitance arms and a variable point on one of said resistance arms, for the purpose of balancing the effect of leakage current across said probe.

8. In electronic level supervising apparatus; a detecting bridge network comprising two series connected resistance arms which are connected across a current source in parallel with two series connected capacitance arms, one capacitance arm consisting of a capacitance probe adapted for immersion in the material whose level is to be supervised; means for connecting the normally equipotential junction points between said resistance arms and said capacitance arms to electrical relay means; a shunting resistor connected between the junction point of said resistance arms and a variable tap on one of said resistance arms, and a grid return resistor connected between the junction point of said capacitance arms and a variable tap on said shunting resistor.

9. In electronic apparatus wherein unbalance of intermediate normally equipotential junction points of a bridge network indicates variation of one of the bridge impedances, an electron discharge system having cathode and control electrode, a connection from said cathode to one of said junction points, a connection from said control electrode to the other one of said junction points; a shunting impedance connected between one of said junction points and a variable tap on one of said bridge impedances; and a grid return impedance connected between the other of said junction points and a variable tap on said shunting impedance.

10. Electric level supervising apparatus comprising an alternating current source; a detecting bridge network connected to said source and including a parallel connection two series connected pairs of impedances, one a detecting impedance; electric relay means having input circuit; means for connecting said input terminals to the normally equi-potential junction points of said pairs; and an impedance connecting one of said junction points to a variable tap on one of the opposite pairs of impedances.

11. Electric level supervising apparatus comprising an alternating current source; a detecting bridge network connected to said source and including in parallel connection two series connected pairs of impedances, one a detecting impedance; electric relay means having input terminals and an output circuit; operator means connected in said output circuit; means for connecting said input terminals to the normally equi-potential junction points of said pairs; a shunting resistor connected between one of said junction points and a variable tap on one of the adjacent impedances, and an impedance connecting the other of said junction points to a variable tap on said shunting resistor.

12. Electronic apparatus for detecting changes of a supervising impedance comprising: an alternating current source having first and second terminals, a detecting bridge network including two series connected resistance arms connected across said source and two series connected capacitance arms connected across said source, one capacitance arm consisting of a capacitance probe adapted for immersion in the material whose level is to be supervised; a shunting resistor connected between the junction point of said resistance arms and a variable tap on one of said resistance arms, and a grid return resistor connected between the junction point of said capacitance arms and a variable tap on said shunting resistor; a first electron discharge device having a control electrode connected to said grid return resistor; and a cathode connected to a point between said resistance arms; a rectifier and a filter network in the anode connection of said discharge device; a second electron discharge device having a control grid, an anode connected to said first terminal and a cathode connected to a point between said two resistance arms; a capacitor arranged for coupling the control grid of said second device to the output circuit of said first device; a biasing network connected to said source and including in series connection a low resistance connected to said first terminal, a high resistance, and a low impedance condenser connected to said second terminal, and a capacitor shunting said low resistance, the anode connection of said second device being through said parallel-connected shunting capacitor and low resistance; and a third electron discharge device having an output circuit connected to said source, a load impedance in said output circuit, and a control grid connected to a point between said high resistance and said low impedance capacitor, so that the charge on said low impedance capacitor, resulting from an increase in the conductivity of said second device, applies to said last named control grid a voltage tending to render said third device less conductive.

13. Electronic apparatus for detecting changes of a supervising impedance comprising: an alternating current source having first and second terminals, a detecting bridge network including two series connected resistance arms connected across said source and two series connected capacitance arms connected across said source, one capacitance arm consisting of a capacitance probe adapted for immersion in the material whose level is to be supervised; a shunting resistor connected between the junction point of said resistance arms and a variable tap on one of said resistance arms and a grid return resistor connected between the junction point of said capacitance arms and a variable tap on said shunting resistor; a first electron discharge system having a cathode connected to a point between said resistance arms, an anode connected to said first terminal and a control grid connected to said grid return resistor; a directional network adapted to rectify the voltage applied to said anode and cathode; a second electron discharge system having a control grid coupled by capacitance to the output circuit of said first system and an anode connected to said first terminal; a biasing network connected to the output circuit of said second system and adapted to establish a unidirectional potential difference proportionate to the alternating current input of said second system; and a third electron discharge system having a cathode and a control grid connected to receive said unidirectional potential difference from said network; said unidirectional potential applying to said grid of said third system, upon an alternating potential difference appearing between said bridge junction points and increasing the conductivity of said second system, a voltage tending to render said third system less conductive.

14. Electronic apparatus for differentially detecting changes at two regions of the range of a variable supervising impedance, comprising an alternating current source having first and second terminals; a bridge network including two resistance arms connected in series to said source, and two capacitance arms connected in series to said source, one capacitance arm constituting said supervising impedance and the other capacitance arm constituting a capacitance system including two exchangeable capacitors of unequal impedance, switch means for inserting one or the other of said capacitors in said bridge, a magnetic relay for selectively operating said switch means, and an adjustable resistor for balancing leakage resistance of said supervising capacitor; a first electron discharge device having a control electrode connected to a bridge junction point between said capacitance arms, and a cathode connected to a bridge junction point between said resistance arms; a rectifier and a filter network in the anode connection of said discharge device; a second electron discharge device having a control grid, an anode connected to said first terminal and a cathode connected to a point between said two resistance arms; a capacitor arranged for coupling the control grid of said second device to the output circuit of said first device; a biasing network connected to said source and including in series connection a low resistance connected to said first terminal, a high resistance, and a low impedance condenser connected to said second terminal, and a capacitor shunting said low resistance, the anode connection of said second device being through said parallel-connected shunting capacitor and low resistance; and a third electron discharge device having an output circuit connected to said source, said magnetic relay connected in parallel with a condenser in said output circuit, and a control grid connected to a point between said high resistance and said low capacitor, so that the charge on said low impedance capacitor, resulting from an increase in the conductivity of said second device, applies to said last named control grid a voltage tending to render said third device less conductive.

PHILLIP J. CADE.

REFERENCES CITED

The following references are of record in the file of this patent:

UNITED STATES PATENTS

| Number | Name | Date |
| --- | --- | --- |
| 2,137,419 | Shepard, Jr. | Nov. 22, 1938 |
| 2,138,344 | Geyger | Nov. 29, 1938 |
| 2,207,976 | Ferrell | July 16, 1940 |
| 2,316,875 | Laboulais | Apr. 20, 1943 |
| 2,326,274 | Young | Aug. 10, 1943 |
| 2,408,819 | Sorenson | Oct. 8, 1946 |
| 2,413,020 | Wolfner, 2d | Dec. 24, 1946 |
| 2,425,733 | Gille et al. | Aug. 19, 1947 |